Figure 1:
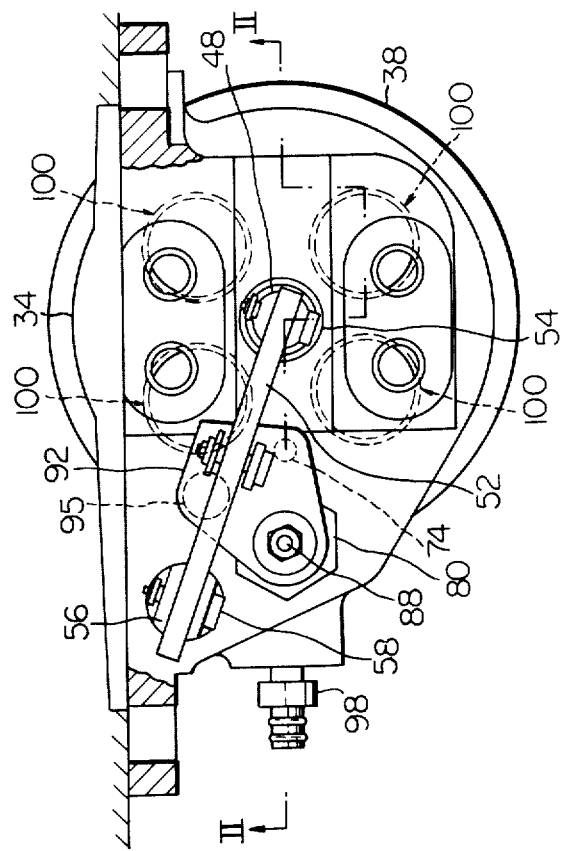

United States Patent [19]
Aikawa et al.

[11] 3,876,227
[45] Apr. 8, 1975

[54] VEHICLE LEVEL CONTROL DEVICE

[75] Inventors: Hiroshi Aikawa; Naganori Ito, both of Tokyo, Japan

[73] Assignee: Nissan Motor Company, Limited, Yokohama, Japan

[22] Filed: Mar. 7, 1974

[21] Appl. No.: 449,197

[52] U.S. Cl. ............................ 280/124 F; 267/65 D
[51] Int. Cl. ........................ B60g 17/00; B16f 5/00
[58] Field of Search ......... 280/124 F; 267/64, 65 R, 267/65 D, DIG. 1, DIG. 2

[56] References Cited
UNITED STATES PATENTS

| | | |
|---|---|---|
| 3,761,110 | 9/1973 | Grosseau .......................... 267/64 R |
| 3,836,166 | 9/1974 | Bainbridge ..................... 280/124 F |

*Primary Examiner*—Philip Goodman

[57] ABSTRACT

A master cylinder, a master piston movable in the master cylinder depending on controlled fluid pressure variations in the master cylinder, and a plurality of pumping units incorporated into the master cylinder and respectively connected with hydropneumatic shock absorbers, wherein each of the pumping units is driven by the master piston in response to controlled change in the fluid pressure acting on the master piston.

10 Claims, 2 Drawing Figures

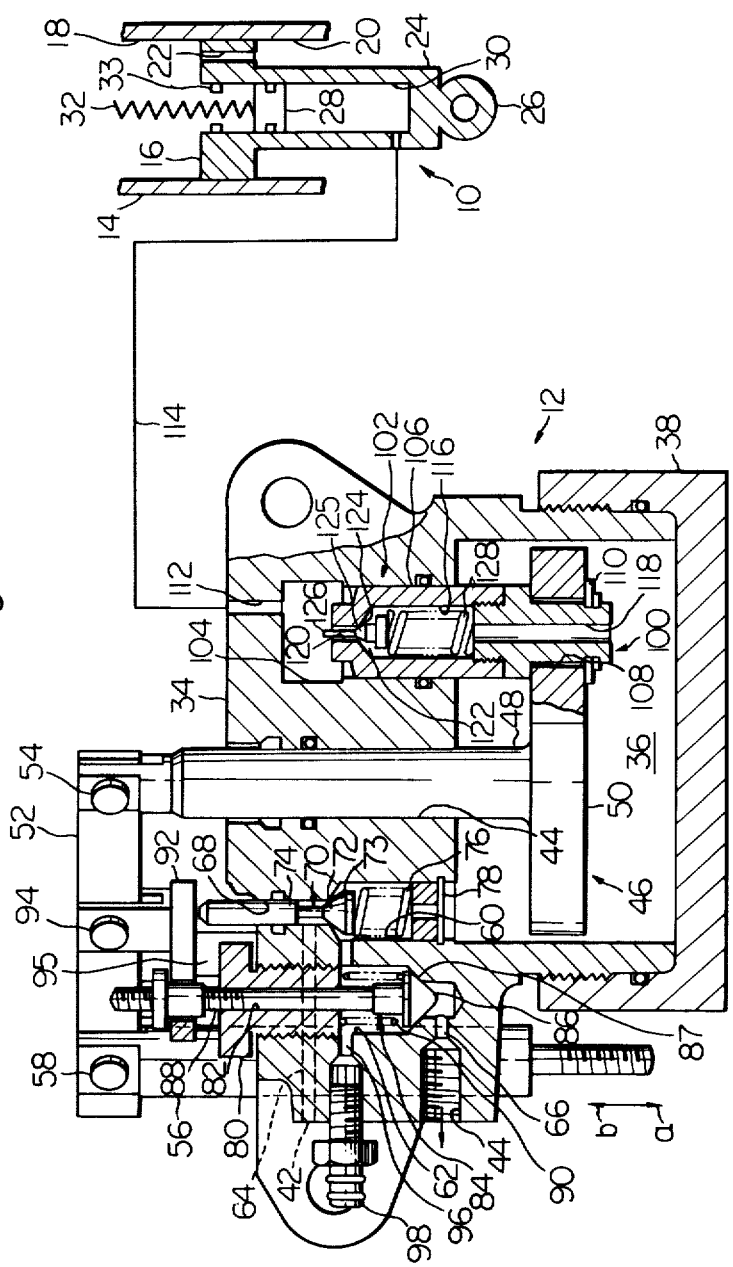

VEHICLE LEVEL CONTROL DEVICE

The present invention relates to suspension systems of vehicles and, more particularly, to adjustable suspension units of a hydropneumatic suspension system of a vehicle.

Suspension systems using laminated, coil and torsion-bar springs are sometimes provided with adjustable suspension units so that the "trim", or general level, of the vehicle bodies can be maintained despite wide variations in load on the vehicles. The suspension systems thus adapted to adjust the levels of the vehicle bodies "from the drivers' seats" are now incorporated in today's automotive vehicles.

One prior art suspension system of this nature uses a plurality of suspension units each having a closed cylinder filled with fluid under pressure and a piston slidable in the cylinder. The piston is integral with a plunger having a bore which is open at one end to the chamber in the cylinder and closed at the other end. The plunger is fixed to an axle of the vehicle while the cylinder is fixed to the vehicle body. A floating piston is slidable in the bore in the plunger and thus defines a closed level-control chamber in the bore. The floating piston is biased by a spring toward a position to downwardly move the vehicle body. Such a spring action and the pressure air acting on the floating piston are opposed by a hydraulic pressure directed into the level control chamber so that the vehicle body is raised when an increased hydraulic pressure is developed in the level control chamber and lowered when the pressure in the chamber decreases. Each one suspension unit thus constructed is mounted between the vehicle body and the axle of each of the road wheels.

The hydraulic pressure in the level control chamber is controlled by a pressure control unit comprising a master cylinder and a valve which is housed in a casing integral with the master cylinder. The valve is movable between three different positions, a position to feed the working fluid into the master cylinder, a neutral position and a position to drain the working fluid off the master cylinder. The master cylinder incorporates therein a master piston to which the valve is connected through a control lever. The valve is shifted between the three different positions by means of this control lever so that the pressure in the master cylinder is varied.

The master piston has a piston head which is snugly and yet slidably received in the master cylinder and which has a center axis aligned with an axis of the pistion rod. To establish a snug fit between the piston head and the master cylinder and to have the axes of the piston head and the piston rod accurately aligned with each other, sophisticated precision machining which results in an increased production cost is thus indispensable for the manufacture of the pressure control unit of the nature above described. Furthermore, assured sealing should be provided between the master cylinder and the head of the master piston. Such a sealing gives rise to an increased sliding friction between the master cylinder and the piston head and, for this reason, a disproportionately large amount of force is required for driving the master piston. Since, moreover, the sliding surface of the master piston is in part but over a considerably large area exposed to the outside of the master cylinder so that dust tends to deposit on the sliding surface of the master piston, this results in early abrasion and accordingly in a shortened service life of the piston. The present invention thus contemplates provision of an automotive hydropneumatic suspension system which is free from all the drawbacks of the prior art suspension systems of the character above described.

It is, therefore, an important object of the present invention to provide an improved level control device of a hydropneumatic suspension system of a vehicle.

It is another important object of the invention to provide an improved vehicular level control device featuring a pressure control unit which can be built without resort to precision machining and strict alignment of parts cooperating with each other.

It is still another important object of the invention to provide an improved vehicular level control device featuring a pressure control unit having movable parts which are subject to minimized friction and which can accordingly be moved by a minimum of driving effort.

It is still another important object of the invention to provide an improved vehicular level control device featuring a pressure control unit in which practically all the surfaces subject to sliding movements are enclosed within a closed structure and which are consequently free from deposit of dust that would otherwise cause abrasion and shortened service life of the sliding members.

It is still another object of the invention to provide an improved vehicular level control device featuring a pressure control unit which can be degassed by a simple procedure and which is capable of automatically restoring its initial condition immediately upon completion of the degassing operation.

It is still another important object of the invention to provide an improved vehicular level control device featuring a pressure control unit which is adapted to equalize working pressures directed to a plurality of suspension units respectively associated with road wheels of the automotive vehicle.

Yet, it is another important object of the present invention to provide a vehicular level control device which is simple in construction and economical to manufacture.

In accordance with the present invention, all these and other objects are accomplished in a vehicular level control device comprising a plurality of hydropneumatic suspension units respectively associated with axles of road wheels of the vehicle, a master cylinder having inlet and outlet ports for a hydraulic fluid, a master piston movable in the master cylinder between first and second positions depending upon fluid pressure in the master cylinder, the master piston being moved toward the first position in response to closing of the inlet port of the master cylinder and toward the second position in response to closing of the outlet port of the master cylinder, a plurality of pumping means which are respectively associated with the suspension units, each of the pumping means comprising a pump cylinder incorporated in the master cylinder and hydraulically connected to the associated suspension unit and a pump plunger which is longitudinally slidable in the pump cylinder substantially parallel to the direction of movement of the master piston, the pump plunger being movable together with the master piston between a first position to actuate the associated suspension unit toward a condition to lift up the vehicle body and a second position to actuate the associated suspension unit oward a condition to lower the vehicle body, the pump plungers of all the pumping means being moved toward their respective first and second positions in unison with each other and by the movements of the master piston to its first and second positions, respectively, first and second valves which are operable on the inlet and outlet ports, respectively, of the master cylinder, and manually operated control means for selectively actuating the first and second valves so as to move the master piston between the first and second positions thereof.

For the purpose of equalizing the working pressures acting upon the individual suspension units, each of the pumping means may further comprise a passage means for providing fluid communication between the master cylinder and the associated suspension unit through the pump cylinder, and a valve for closing the passage means when the pump plunger is located away from its first position so that the hydraulic fluid in the master cylinder is directed through the passage means into the suspension unit for actuating the suspension unit to the condition to lift up the vehicle body when the pump plunger is moved to its first position.

Other features and advantages of a level control device according to the present invention will become more apparent from the following description taken in conjunction with the accompanying drawings, in which:

FIG. 1 is a side end view of a vehicle level control device embodying the present invention; and FIG. 2 is a section on line II—II of FIG. 1.

Referring now concurrently to FIGS. 1 and 2 of the drawings, the automotive level control device according to the present invention consists of a plurality of suspension units 10 (only one of which is illustrated in FIG. 2) and a hydraulic pressure control unit 12 which is common to the suspension units 10. The suspension units 10 are respectively associated with the road wheels of an automotive vehicle and have a similar construction which is well known in the art. Each suspension unit 10 thus comprises a cylinder 14 having a closed cylinder chamber and a piston 16 which is longitudinally slidably received in the cylinder chamber. The piston 16 divides the cylinder chamber into upper and lower compartments 18 and 20, respectively, which communicate with each other through a restricted passageway 22 formed in the piston 16. The upper and lower compartments 18 and 20 are filled with fluid under pressure so that shocks and vibrations transferred from the road wheels are dampened by the movement of the fluid across the piston 16 through the passageway 22. Though not illustrated in FIGS. 1 and 2, the cylinder 14 is connected at its upper end to a body structure of the vehicle usually through an accumulator serving as a hydropneumatic spring.

The piston 16 is integral with a plunger 24 which projects outwardly from a lower end (not shown) of the cylinder 14 and is fixed at its lower end portion 26 to an axle (not shown) of the road wheel. The plunger 24 is formed with an elongate bore which is closed at its lower end and open at its upper end to the upper compartment 18 of the cylinder 14. A floating piston 28 is longitudinally slidably received in the elongate bore of the plunger 24, defining a level control chamber 30 in the bore. The level control chamber 30 has an inlet port for a hydraulic fluid which is fed from the hydraulic pressure control unit 12 as will be described later.

The floating piston 28 is thus subjected on one side to the fluid pressure built up in the upper compartment 18 of the cylinder 14 and the fluid pressure directed into the level control chamber 30 from the pressure control unit 12. A levelling spring 32 is seated at one end on an upper portion (not shown) of the cylinder 14 and at the other end on an upper face of the floating piston 28, biasing the floating piston 28 downwardly, viz., away from the upper compartment 18 of the cylinder 14. The floating piston 28 will thus assume a balanced position when the force exercised by fluid pressure in the level control chamber 30 is equalized with the sum of the force of the spring 32 and the force exercised by fluid pressure in the upper compartment 18 of the cylinder 14. The floating piston 28 is moved upwardly in response to an increase in the fluid volume and pressure in the level control chamber 30 and lifts up the cylinder 14 and accordingly the vehicle body through the levelling spring 32. Such an upward movement of the floating piston 28 relative to the piston 14 is limited by a stop member 33 which is located at an upper end of the bore in the plunger 24. The suspension unit 10 thus constructed is mounted between the vehicle body and each of the axles of the road wheels so that the ground clearance of the vehicle is automatically adjusted by the self-adjusting action of the suspension units when the body load is changed. It has been assumed in the above description that the cylinder 14 is connected to the vehicle body and the plunger 24 connected to the axle, however, the cylinder 14 and the plunger 24 may be connected conversely to the axle and the vehicle body, respectively, where desired.

The hydraulic pressure control unit 12 comprises a casing 34 having a chamber 36 which is closed by a plug member 38. The casing 34 serves as a master cylinder and thus has fluid inlet and outlet ports 40 and 42, respectively, for a hydraulic fluid to operate in the chamber 36. The casing 34 is formed with an elongate bore 44 which is open at one end to the chamber 36 in the casing 34 and at the other to the outside of the casing. A piston 46 has a piston rod 48 which is longitudinally slidably received in this elongate bore 44 and which carries a piston head 50 at its inner end projecting into the chamber 36 in the casing 34. The piston rod 48 has an outer end projecting outwardly of the casing 34 and is pivotally connected thereat to one end of a control arm 52 through a pivotal pin 54. The control arm 52, in turn, is further pivotally connected at the other end to a control rod 56 through a pivotal pin 58. The control rod 56 is longitudinally movable in the directions of arrows *a* and *b* (FIG. 2) and is connected through a suitable mechanical linkage to a control knob which is adapted to be manipulated from a driver's seat, though not shown in the drawings.

The casing 34 is further formed with first and second valve chambers 60 and 62, respectively, each of which communicates at one end with the chamber 36. The first valve chamber 60 communicates at the other end with the other end with the fluid inlet port 42 through a passageway 64 and the second valve chamber 62 communicates at the other end with the fluid outlet port 44 through a passageway 66. The first valve chamber 60 merges into a bore 68 which extends substantially parallel to the piston rod 48 and the control rod 56 and which is open to the outside in proximity to the control arm 52. A first valve 70, which is herein shown in the form of a poppet valve by way of example, has a valve head 72 and seat 72a located in the valve chamber 60 and a valve stem 74 which is longitudinally slidably received in the bore 68, the valve stem 74 having an outer end portion projecting out of the casing 34 toward the control arm 52. In the first valve chamber 60 is further disposed a preload spring 76 which is seated at one end on the head 72 of the poppet valve 70 and at the other end on an apertured spring seat 78 located at the end of the valve chamber 60 adjacent the chamber 36. The valve 70 is thus urged by the preload spring 76 toward a closed position to block the communication between the chamber 36 and the fluid inlet port 42. A valve guide member 80 is inserted into the second valve chamber 62 and has an elongate bore 82 which extends substantially parallel to the piston rod 48 and the control rod 56 similarly to the bore 68. A second valve 84, which is also shown as a poppet valve, has a valve head 86 and seat 87 located in the second valve chamber 62 and a valve stem 88 longitudinally slidably received in the bore 82 in the valve guide member 80, which valve stem has an outer end portion projecting out of the casing 34 toward the control arm 52 similarly to the valve stem 74 of the first valve 70. In the second valve chamber 62 is further located a preload spring 90 which is seated at one end on the head 86 of the second valve 84 and at the other end on the inner end of the valve guide member 80 so that the valve 84 is biased toward a closed position to block the communication between the chamber 36 and the fluid outlet port 44.

A valve actuating member 92 is pivotally connected to the control arm 52 through a pivotal pin 94 located in the intermediate portion between the pivotal pins 52 and 58 carrying the piston rod 48 and the control rod 56, respectively. The valve actuating member 92 has a portion abutting on the leading ends of the valve stems 74 and 88 of the first and second valves 70 and 84, respectively, which are thus engageable therewith as it is moved with the control arm 52 as shown in FIG. 2. When the valve actuating member 92 is moved toward the casing 34, viz., downwardly of the drawing (FIG. 2), the first valve 70 is opened against the action of the preload spring 76 to establish communication between the chamber 36 and the fluid inlet port 42 while the second valve 84 stays closed by the action of the associated preload spring 90. When, conversely, the valve actuating member 92 is moved away from the casing 34, viz., upwardly of the drawing (FIG. 2), then the first valve 70 stays closed and, in turn, the second valve 84 is opened to establish communication between the chamber 36 and the fluid outlet port 44. The valve actuating member 92 is formed with a guide member 95 which is secured to the casing 34 for guiding the movement of the valve actuating member 92.

Where desired, the passageway providing communication between the chamber 36 and the fluid outlet port 44 may be branched off to a degassing passageway 96 which is closed by a releasable plug 98. This degassing arrangement is adapted to allow air entrapped in the chamber 36 to escape to the outside of the casing 34 together with the fluid in the chamber 36.

The hydraulic pressure control unit 12 is further provided with a plurality of pumping units 100 which are respectively associated with the individual suspension units 10. The pumping units 100 are illustrated in FIG. 1 as four in number because the level control device is herein assumed, by way of example, to be incorporated into a four-wheeled automotive vehicle. As seen in FIG. 2, each of the pumping units 100 comprises a pump cylinder 102 which is formed integrally with the casing 34 serving as the master cylinder. The pump cylinder 102 is formed with a cylindrical chamber 104 in which a pump plunger 106 is longitudinally slidably received. The pump plunger 106 projects into the chamber 36 in the casing 34 and is connected at its leading end to the piston head 50 of the piston rod 48. One of the features of this invention is that the manufacturing tolerances regarding the piston head 50 are great also in making connections to the plungers 106. Openings 108 may be made substantially larger in diameter than those of the plungers 106 since the plungers are held in radial position by cylindrical chambers 104. Each pump plunger 106 is inserted at its leading end portion through the corresponding opening 108 formed in the piston head 50 and is held to the piston head by means of a snap ring 110. The pump cylinder 102 has a fluid outlet port 112 which is in constant communication through a passageway 114 with the level control chamber 30 of the suspension unit 10 with which the pumping unit 100 is associated.

By preference, each of the pumping units 100 may be provided with a valve for providing controlled communication between the chamber 36 in the casing 34 and the level control chamber 30 of the suspension unit 10. For this purpose, the pump plunger 106 has a bore 116 which is constantly in communication with the chamber 36 through a passageway 118 formed in the plunger 106 and which is open to the chamber 104 in the pump cylinder 102 through an orifice 120. A valve 122 has a valve head 124 and seat 125 located in the bore 116 and a valve stem 126 projecting through the orifice 120 toward an end wall of the pump cylinder 102. In the bore 116 is also located a preload spring 128 which is seated at one end on the head 124 of the valve 122 and at the other end on an end wall of the bore 116 so that the valve 122 is biased toward a closed position. When the plunger 106 is moved deeper to its extreme position in the chamber 104 of the pump cylinder 102 the stem 126 of the valve 122 strikes against the end wall of the pump cylinder 102, opening the valve 122 against the action of the preload spring 128 so that communication is established between the chamber 36 of the casing 34 and the chamber 104 of the pump cylinder 102 through the passageway 118, the bore 116 and the orifice 120 in the pump plunger 106.

The operation of the level control device having the construction thus far described will now be explained.

When the body load is increased and it is desired to have the vehicle body raised, the driver operates the control rod 56 to move it downward, viz., in the direction of the arrow a indicated in FIG. 2 so that the control arm 52 is turned counterclockwise of FIG. 1 about the pivotal pin 54 carrying the stem 48 of the master piston 46. The valve actuating member 92 is moved together with the control arm 52 toward the casing 34 so that the first valve 70 is opened against the action of the preload spring 76 to establish communication between the chamber 36 and the fluid inlet port 42. The hydraulic fluid is consequently directed into the chamber 36 so that the piston 46 is moved away from the plug member 38 and, in turn, moves the pump plungers 106 of all the pumping units 100 deeper in the respective pump cylinders 102 to their extreme positions. The working fluid in each pump cylinder 104 is accordingly fed through the passageways 114 into the level control chambers 30 of the respective suspension units 10. The floating pistons 28 of the suspension units 10 are thus moved upwardly relative to the plungers 24 whereby the cylinders 14 of the suspension units 10 are concurrently lifted up so as to raise the vehicle body relative to the ground.

As the master piston 46 is thus moved upwardly of the drawing (FIG. 2), the control arm 52 is turned counterclockwise about the pivotal pin 58 carrying the control rod 56 with the result that the valve actuating member 92 is moved to allow the first valve 70 to close by the action of the preload spring 76. The supply of the working fluid to the chamber 36 is therefore interrupted and accordingly the pump plungers 102 of the pumping units 100 are made stationary. The vehicle body is now maintained at the level it was thus raised to.

When, on the contrary, the load on the vehicle body is decreased and it is desired to have the vehicle body lowered, the driver now operates the control rod 56 to move it upward, viz., in the direction of the arrow b indicated in FIG. 2 so that the control arm 52 is turned clockwise of FIG. 2 about the pivotal pin 54. The valve actuating member 92 is moved together with the control arm 52 away from the casing 34 so that the second valve 84 opens against the action of the preload spring 90 to establish communication between the chamber 36 and the fluid outlet port 44. The hydraulic fluid in the chamber 36 is consequently de-pressurized and partly drained through the fluid outlet port 44 whereby the master piston 46 is moved toward the plug member 38 and, in turn, moves the pump plungers 106 of all the pumping units 100 away from the end walls of the respective pump cylinders 102. The working fluid in the level control chambers 30 of the individual suspension units 10 is therefore returned to the chambers 104 of the respective pump cylinders 102 with the result that the floating pistons 38 of the suspension units 10 are moved downwardly relative to the plungers 24 and accordingly the vehicle body is lowered in proportion to the displacement of the fluid from the chamber 36 in the master cylinder.

As the master piston 46 is thus moved downwardly of the drawing (FIG. 2), the control arm 52 is turned clockwise about the pivotal pin 58 so that the valve actuating member 92 is moved to allow the second valve 84 to close by the action of the preload spring 90. The drainage of the working fluid from the chamber 36 is consequently interrupted so that the pump plungers 102 of the pumping units 100 are rendered stationary. The vehicle body is now maintained at the level it is thus lowered to.

The passageways 114 interconnecting the pump cylinders 102 and the associated suspension units 10 are subject to leaks of the degrees which vary from one of the passageways to another. It is, for this reason, likely that the suspension units 10 become inoperative to be acted upon by the working fluid all in unison with each other. This will result in irregularity of the levels determined by the individual suspension units and accordingly in an unbalanced condition of the vehicle body. The valve arrangement provided in each of the pumping units 100 is intended to remedy the irregular distribution of the hydraulic fluid to the suspension units 10.

To compensate for such an irregular pressure distribution, the driver operates the control rod 56 to move it downwardly of FIG. 2, viz., in the direction of the arrow a until the fluid pressure in the chamber 36 increases to such an extent as the pump plungers 106 of the pumping units 100 advance deeper in the pump cylinders 102 and are brought into abutting engagement with the end walls of the cylinders. The valve stems 126 of the valves 122 are thus depressed by the end walls of the pump cylinders 102 and are consequently withdrawn into the orifices 120 in the pump plungers 106. The head 124 of each of the valves 122 is accordingly unseated from the corresponding seat 125 and established communication between the bore 116 in the plunger 106 and the fluid outlet port 112 in the cylinder 102 whereby the hydraulic fluid in the chamber 36 in the casing 34 is fed to the level control chamber 30 of each of the suspension units 10 through the passageway 118, bore 116 and orifice 120 in the pump plunger 106 and through each passageway 114. The floating pistons 28 of all the suspension units 10 are therefore moved up relative to the associated plungers 30 until they abut against the stop members 33. Under these conditions, the vehicle body is raised to its highest possible position. When such conditions are reached, the driver operates the control rod 56 to move it upwardly of the drawings (FIG. 2), viz., in the direction of the arrow b so that the fluid pressure in the chamber 36 decreases and accordingly the pump plungers 106 of all the pumping units 100 are lowered, viz., moved away from the end walls of the associated pump cylinders 102 so that the valves 122 of the pumping units 100 are closed by the actions of the preload springs 128. The fluid pressures prevailing in the level control chambers 30 of all the suspension units 10 are in this manner equalized with each other.

For the purpose of scavenging the chamber 36 to remove air entrapped therein, the plug 98 closing the degassing passageway 96 should be released from the casing 34, so that air in the chamber 36 is allowed to escape therefrom together with some fluid in the chamber. As a consequence of the resultant decrease in the fluid pressure in the chamber 36, the master piston 46 is moved toward the plug member 38 so that the control arm 52 is turned clockwise about the pivotal pin 58 carrying the control rod 56. The first valve 70 is consequently opened by the valve actuating member 92 whereby the chamber 36 of the master cylinder is replenished with additional hydraulic fluid. When the degassing passageway 96 is then closed for a second time by the plug 98 upon completion of the degassing operation, then the fluid pressure in the chamber 36 ceases to decrease and the master cylinder 46 is moved away from the plug member 38 of the casing 34 so that the first valve 70 is closed by the action of the preload spring 76.

From the foregoing description it will now be appreciated that all the objects of the present invention can be advantageously accomplished in the level control device according to the present invention. For one thing, the head 50 of the master piston 46 need not be snugly fitted on the master cylinder 36 and, for this reason, consideration need be paid neither to the configurations of the master cylinder and the piston head of the master cylinder nor to the sealing between the cylinder and the piston head. Since, moreover, the piston head may have a center axis which is offset from the center axis of the piston rod 48 as will be apparent from FIG. 2, neither precision machining of the piston and cylinder nor strict alignment between these members is required during production of the device. All these will contribute to reduction of the production cost of the device. The device according to the present invention is further characterized in that, since all the members subject to sliding movement are enclosed within the casing 34 except for the leading end portion of the piston rod 48 of the master piston 46, the device in its entirety is practically free from accumulation of dust which would otherwise result in increased friction between sliding members and accordingly in a shortened service life of the device.

What is claimed is:

1. A vehicle body level control device of a wheeled vehicle, comprising a plurality of hydropneumatic suspension units respectively cooperating with road wheels of the vehicle; a master cylinder having inlet and outlet ports for a hydraulic fluid to operate in the master cylinder; a master piston movable in said master cylinder between first and second positions depending upon fluid pressure in the master cylinder, the master piston being moved toward said first position in response to opening said inlet port which closes when said first position is reached and toward said second position in response to opening said outlet port which closes when said second position is reached; a plurality of pumping units which are respectively cooperating with said suspension units, each of the pumping units comprising a pump cylinder incorporated in the master cylinder and hydraulically connected to the cooperating suspension unit and a pump plunger longitudinally slidable in the pump cylinder substantially parallel to the direction of movement of the master piston, the pump plunger being movable together with the master cylinder between a first position to actuate the cooperating suspension unit to lift the vehicle body and a second position to actuate the cooperating suspension unit to lower the vehicle body relative to ground, the pump plungers of all the pumping units being moved toward their respective first and second positions in unison with each other and by the movement of the master piston to its first and second positions, respectively, first and second valves which are operable on said inlet and outlet ports, respectively, of said master cylinder; and manually operated control means for selectively actuating said first and second valves for moving said master piston between said first and second positions thereof.

2. A vehicle body level control device as set forth in claim 1, in which each of said pumping units further comprises a passageway for fluid communication between said master cylinder and the cooperating suspension unit through the pump cylinder; and a valve for closing said passageway when the pump plunger is located away from its first position and for opening said passageway so that the hydraulic fluid in the master cylinder is directed to the cooperating suspension unit for actuating the suspension unit to lift the vehicle body when the pump plunger is moved to its first position.

3. A vehicle body level control device as set forth in claim 1, further comprising a passageway for venting said master cylinder to the outside of said master cylinder for removing air entrapped in the master cylinder and a plug for releasably closing said passageway.

4. A vehicle body level control device as set forth in claim 1, in which said master piston comprises a piston head which is connected to the pump plungers of said pumping units and a piston rod having a leading end projecting outwardly of said master cylinder cooperating with said control means for selectively actuating said first and second valves depending upon the position of the master piston relative to the master cylinder.

5. A vehicle body level control device as set forth in claim 4, in which said first valve comprises a valve head, a seat and a valve stem partly projecting outwardly of the master cylinder and biasing means for urging the valve head toward a position to close said inlet port and said second valve comprises a valve head, a seat and a valve stem partly projecting outwardly of the master cylinder and biasing means for urging the valve head toward a position to close said outlet port, the first and second valves being engageable at leading ends of their respective valve stems with said control means for being moved to the positions to close said inlet and outlet ports, respectively, as the control means are driven.

6. A vehicle body level control device as set forth in claim 5, in which said control means comprise a control arm which is pivotally connected at one end to the leading end portion of the piston rod of said master piston, a control rod which is pivotally connected at one end to the other end of said control arm and adapted to be manually driven from the other end in first and second directions, and a valve actuating member which is pivotally connected to an intermediate portion of said control arm and which is engageable with the leading ends of the stems of said first and second valves, said control arm being rotatable relative to the piston rod of said master piston and said control rod in a first direction for moving the head of said first valve to open said inlet port in response to movement of said control rod in said first direction and in a second direction for moving the head of said second valve to open said outlet port in response to movement of said control rod in said second direction.

7. A vehicle body level control device as set forth in claim 6, in which said first and second valves are positioned substantially parallel to the piston rod of said master cylinder and their stems are engageable substantially at right angles to said control arm.

8. A vehicle body level control device as set forth in claim 2, in which said valves of each of said pumping units comprise a valve head, a seat and a valve stem longitudinally movably received in an orifice formed in an end wall of the pump plunger and biasing means for urging the valve head to a position to close said orifice and to have its valve stem projecting outwardly of the pump plunger, said valve stem being withdrawn into said orifice for opening the orifice when the pump plunger is moved into its extreme position so that the valve stem is depressed by an end wall of the pump plunger.

9. A vehicle body level control device as set forth in claim 1, in which the piston head of said master piston has its center axis offset from the axis of the piston rod.

10. A vehicle body level control device as set forth in claim 1, in which the pump plunger of each of said pumping units is connected to the piston head of said master piston through an opening and a snap ring, said opening having a substantially larger diameter than that of the plunger.

* * * * *